INVENTORS
Robert T. Bowling
William G. Edward
Gerald F. Scheelke
Harold A. Keller

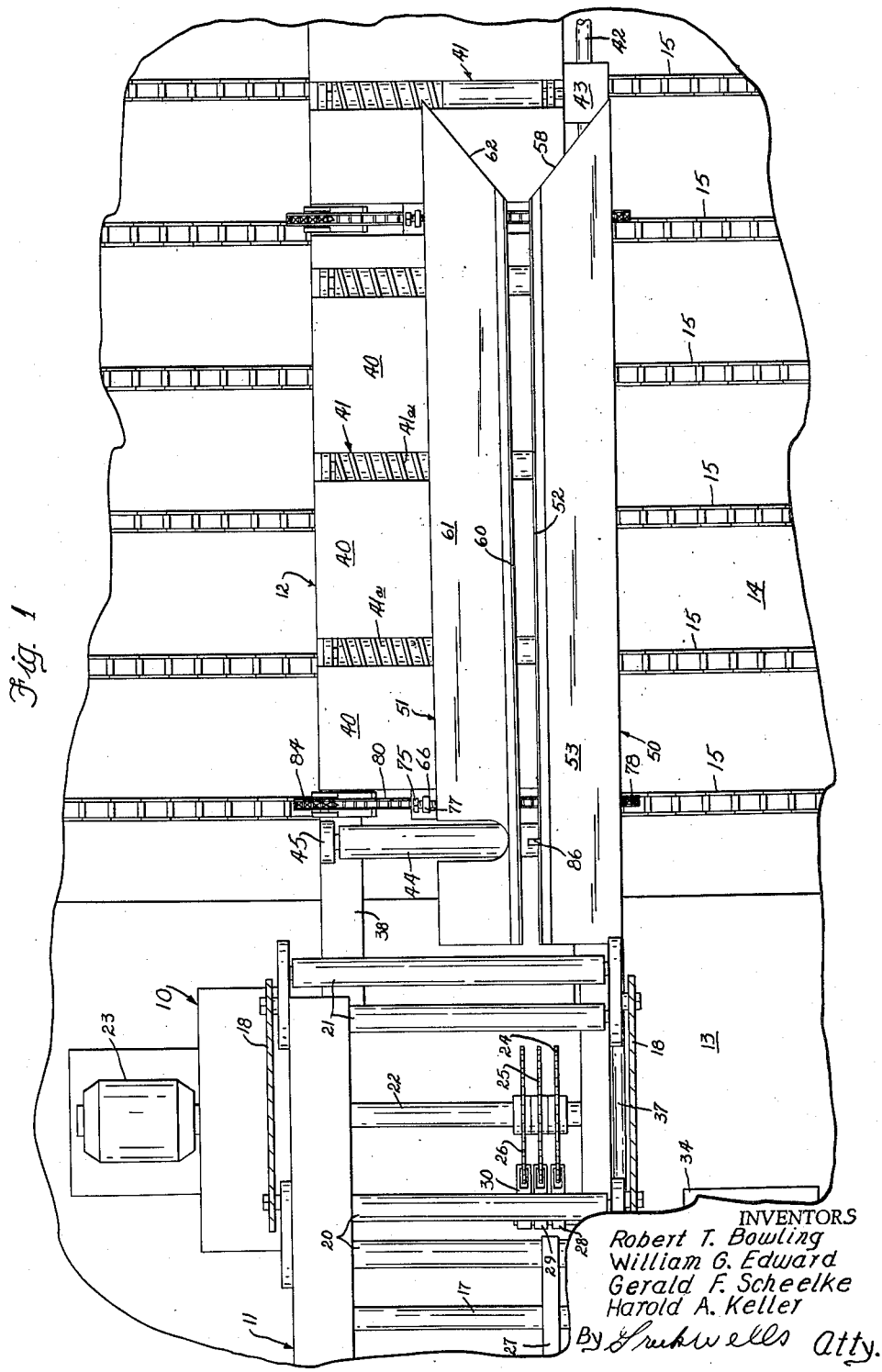

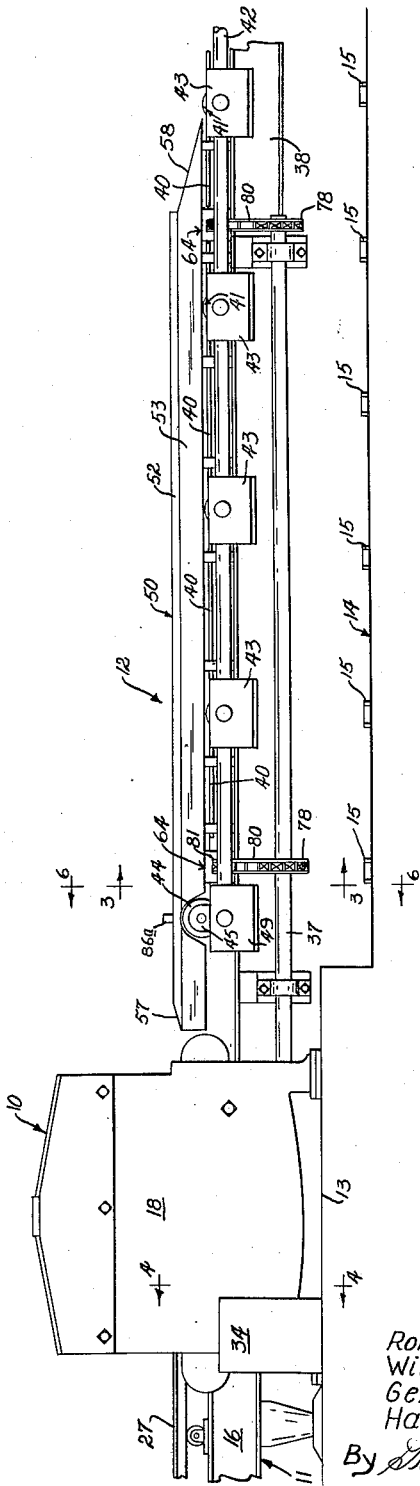

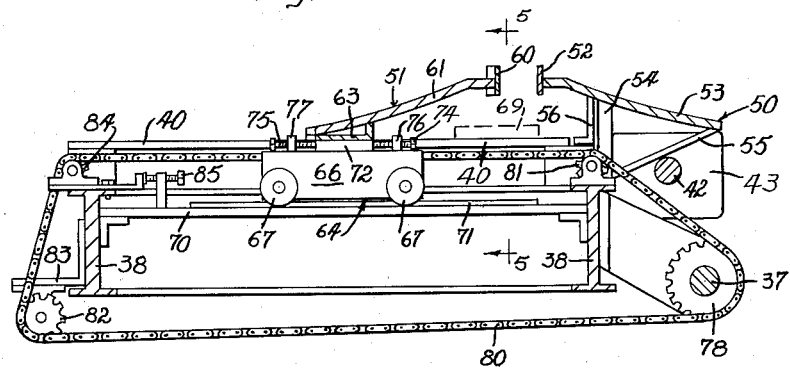
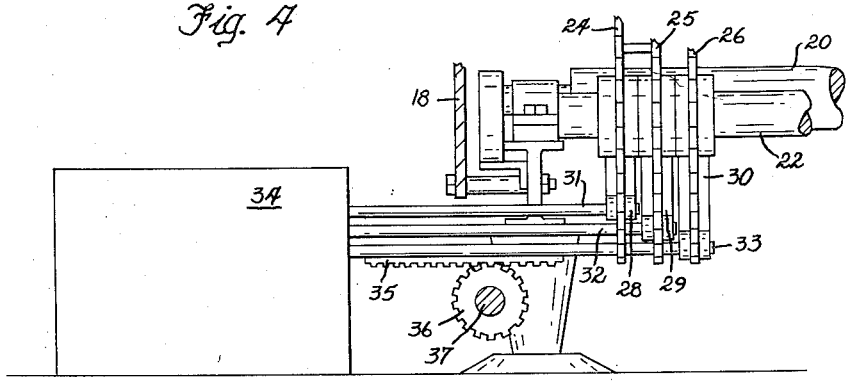

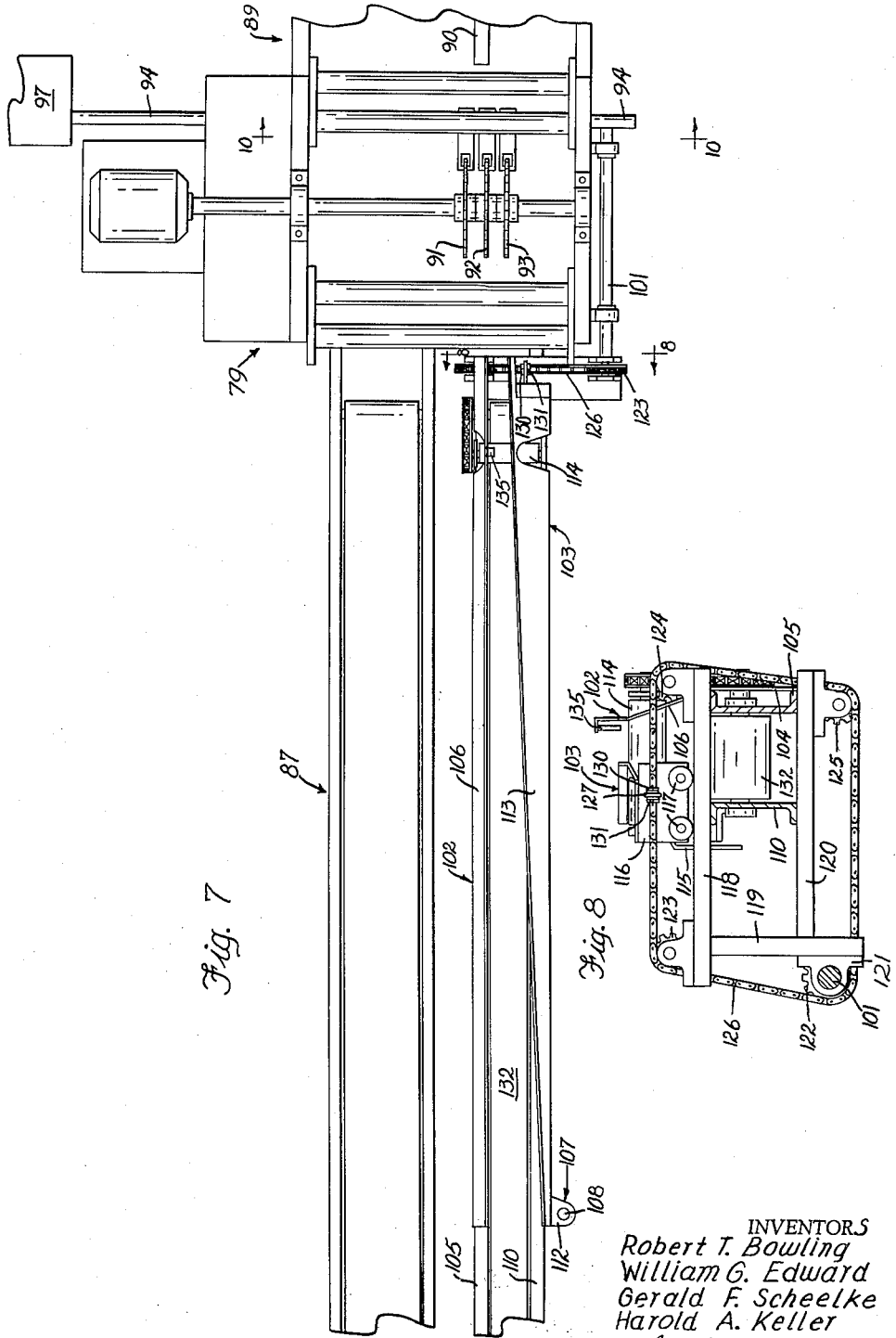

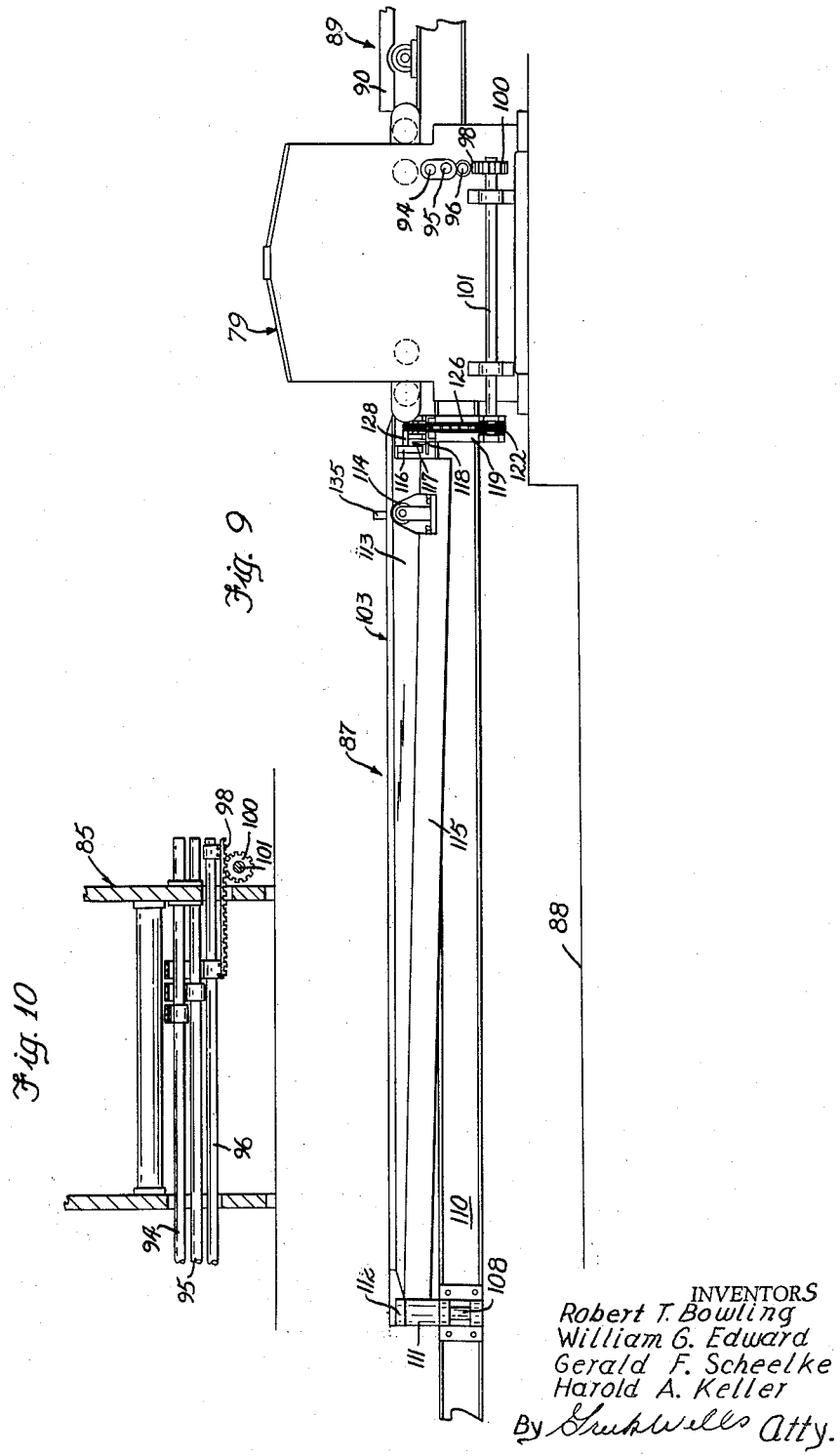

United States Patent Office 3,017,909
Patented Jan. 23, 1962

3,017,909
AUTOMATIC EDGING PICKER FOR SAWMILLS
Robert T. Bowling and William G. Edward, Lewiston, Idaho, and Harold A. Keller and Gerald F. Scheelke, Clarkston, Wash., assignors to Potlatch Forests Inc., Lewiston, Idaho, a corporation of Delaware
Filed Mar. 21, 1960, Ser. No. 16,211
6 Claims. (Cl. 143—157)

This invention relates to an automatic edging picker for use in conjunction with multiple bladed edgers in sawmills. In preparing lumber as a finished product, strips cut near the outside of the log are left in various sizes, with rough wanes or edges. In order to reclaim these boards, a multiple bladed edger is used, which cuts the edgings from each board and shapes the board into one or more salable boards of normal dimensions. Since the edger must necessarily be adapted to each individual board, adjustment for board widths is accomplished by the operator selecting the desired width and moving the saws to the right position. The saw shifting may be manual, semi-automatic, or fully automatic.

The problem in this process concerns the edgings after they have been cut from the boards. They are rough and not uniform, often varying in width as well as length. Since they are loose, they often fly into the air or jam on the outfeed table of the edger. This has made it necessary heretofore to keep a man on the outfeed table to separate the edgings and avoid jams.

It is a first object of this invention to provide an edging picker structure which will automatically adjust itself to compensate for adjustments of the saws in the edger. It is a further object to interrelate the edger controls and the edging picker by means of a limit switch adapted to lock the saw positions until an entire board has dropped to the outfeed table below the edging picker in order that presetting of the saws can be accomplished without waiting for the boards to clear the picker.

It is an object of this invention to provide a means to drop the edged boards out of the way of the edging picker as soon as the boards clear the supports necessary to keep them in contact with the saws, so that the picker can immediately be re-adjusted to new positions. This provides faster board disposal and greater output.

It is another object of the invention to use a lowered roll case on the outfeed table and to provide an elevated roll between the outfeed table and the edger saws so as to insure contact of each board with a control switch until the board can drop on to the outfeed table and then have immediate clearance for re-setting the picker with the saws.

These and still further objects of this invention will be evident from a study of the following specification and the accompanying drawings. A preferred embodiment of the invention is herein described, plus a modified construction which can be used as an alternative. It is to be emphasized that these specific structures are meant only as practical examples of forms possible using this invention. They are not exhaustive and are not intended to limit the extent of the invention except as it is defined in the claims which directly follow the description of the invention.

In the drawings:

FIGURE 1 is a top plan view of a sawmill edger equippped with an edging picker according to this invention, the outer boundaries of the apparatus being broken away;

FIGURE 2 is a side view of the apparatus as seen in FIGURE 1;

FIGURE 3 is a sectional view taken along line 3—3 in FIGURE 2;

FIGURE 4 is a sectional view taken along line 4—4 in FIGURE 2;

FIGURE 7 is a top plan view of an edger equipped with a second form of the invention, the extremities of the apparatus being broken away;

FIGURE 8 is a sectional view taken along line 8—8 in FIGURE 7;

FIGURE 9 is a side view of the apparatus in FIGURE 7; and

Figure 5:
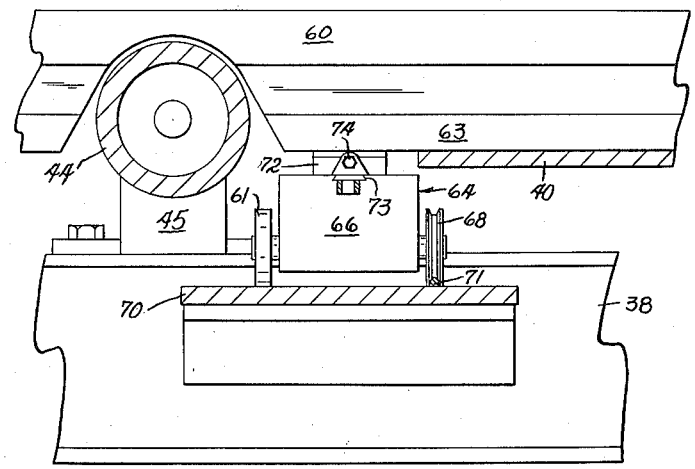
FIGURE 5 is a fragmentary sectional view taken substantially along line 5—5 in FIGURE 3.

FIGURE 10 in a fragmentary sectional view taken substantially along line 10—10 in FIGURE 7.

Referring now to the drawings, and to FIGURES 1 to 6 which show the normal preferred form of the invention, the edger 10, infeed table 11 and outfeed table 12 are shown in their normal positions. The infeed table 11 and edger 10 are mounted on the sawmill floor, designated as 13. The outfeed table 12 spans a slasher deck 14 upon which chains 15 are moved, by means not shown, in a direction transverse to the length of the outfeeed table 12. This general arrangement of the edger is common today in sawmills and will not be further explained. The chains 15 carry any edgings on them to a slasher (not shown) which cuts them into small particles for use as pulp or in chip boards.

The infeed table 11 and edger 10 are not changed by this invention and therefore will not be described in detail. The infeed table 11 has a frame 16 on which are mounted parallel rollers 17. Rollers 17 are merely support rollers and are not driven. The edger 10 has two side support walls 18 on which are mounted infeed power rollers 20 and outfeed power rollers 21. Rollers 20 and 21 are rough rollers, designed to grip the board surfaces and pull the boards through the edger 10. The side support wallls 18 also mount an arbor 22 which is driven by a suitable motor 23, which also supplies power to the power rollers 20 and 21 in common fashion. Mounted on arbor 22 are three saws 24, 25, and 26 which are slidably keyed to arbor 22 so as to rotate with the arbor 22, but may be moved along the arbor 22 to any desired position. The number of saws is arbitrary and may vary from one to any multiple number desired depending upon the width and number of finished boards desired.

Infeed table 11 also mounts a vertical straightedge 27 which is shown in its normal operating position. The straightedge 27 is movable in a transverse direction by common means not shown. Normally it is positioned as shown and one edge of the board being fed to the edger 10 rests along the side of the straightedge for a reference position. However, if a wane is to be removed from both edges of the board, the straightedge is not usable and is then moved back out of the path of the boards.

The saws 24, 25, 26 are positioned by yokes 28, 29, 30 respectively which move the saws on arbor 22. The yokes 28, 29, 30 are positioned by means of rods 31, 32, and 33 respectively, which are slidably mounted on the edger frame and are controlled and moved by a power pack 34. See FIGURE 4. Power pack 34 is normally a hydraulic or pneumatic unit which individually controls the position of each saw with respect to the others. The power pack 34 is indexed so as to space the saws 24—26 to produce the uniform board sizes required for salable lumber. It is controlled by an electrical panel comprising a plurality of manually selectable switches which are operated in a selective manner to accommodate the individual board being processed.

The saws 24—26 are shown in their positions closest to the power pack 34. The rods 31-33 are therefore extendable so as to move saws 24—26 away from power pack 34 in any desired spatial relationship with respect to each other. The saw 26, which is positioned farthest from power pack 34, is controlled by rod 33. Rod 33 has fixed thereon a rack 35 which meshes with a pinion 36 fixed to a picker shaft 37. Shaft 37 is bearingly mounted by the frame of edger 10 and extends along the edger 10 and outfeed table 12 as will be more fully described later. The picker shaft 37 is thereby rotated in response to the movement of rod 33 and saw 26.

Figure 6:
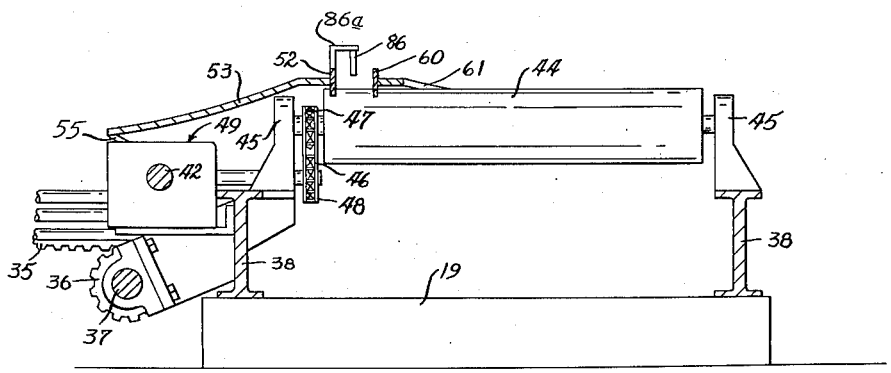
FIGURE 6 is a fragmentary sectional view taken substantially along line 6—6 in FIGURE 2.

The outfeed table 12 comprises a frame of two large I-beams 38 which are rigidly fastened to a transverse support beam 19 in edger 10 (FIGURE 6). The I-beams 38 are lowered from their usual position, and extend outwardly across the slasher deck 14 in normal fashion. The remaining end of the outfeed table is supported on the sawmill floor 13 beyond slasher deck 14 in normal fashion and may be connected to a conveyor or any desired loading apparatus.

The outfeed table 12 has spaced upper plates 40 fixed thereon across the I-beams 38. Between adjacent plates 40 are mounted rollers 41 which are mounted on bearings on the I-beams 38 and which extend upwardly slightly above the upper surface of plates 40. Rollers 41 are driven by a common shaft 42 (FIGURE 2) and a gearcase 43 provided for each roller 41. Shaft 42 is driven by independent power means (not shown). The rollers 41 are screw rolls for one half their length, designated as 41a.

The outfeed table 12 also has mounted thereon an elevated roller 44 located near the end of table 12 adjacent the edger 10. Roller 44 is mounted on extensions 45 fixed to I-beams 38. A gearcase 49 driven by shaft 42 drives roller 44 by means of a chain 46 and two sprockets 47 and 48, see FIGURE 6. Sprocket 47 is driven directly by the output shaft of gearcase 49 and sprocket 48 is fixed to the mounting shaft of roller 44 for integral rotation with the roller 44.

Mounted above the outfeed table 12 are the two edging pickers generally denoted as 50 and 51. The edging picker 50 is stationary. It consists of a vertical blade 52 which extends along table 12, and has attached to it a sloping plate 53 that protrudes over the table 12 beyond the gearcases 43. Plate 53 is supported by vertical bracing 54 fixed to one of the I-beams 38 (FIGURE 3) and by diagonal bracing 55 extending from I-beam 38 outward to the outer portion of sloping plate 53. A length of angle stock 56 extends along outfeed table 12 between the rollers 41 and vertical bracing 54 to enclose the area above rollers 41 and extending to the vertical bracing 54. The blade 52 is seen to be elevated above the outfeed rollers 41. Blade 52 is positioned with its lower surface slightly below the top of elevated roller 44 but cut so as to clear the top of the roller and slightly below the top of power rollers 21. The forward edge 57 of blade 52 is tapered, but not to a sharp cutting edge. It is also cut on an angle extending upwardly and rearwardly from its lower surface as shown in FIGURE 2. Blade 52 and sloping plate 53 extend forwardly to a location adjacent power rollers 21 on edge 10 and extend rearwardly a distance slightly greater than the length of the longest boards to be processed. The rear end of the sloping plate 53 is cut on an angle and is designated by the numeral 58.

The edging picker 51 is movable in a transverse direction with respect to outfeed table 12. It is provided with a vertical blade 60 identical in all respects to the previously described blade 52. Blade 60 is mounted so as to be level with blade 52 and so as to assume the same relationships with rollers 21, 41 and 44.

Blade 60 has rigidly connected to it a sloping plate 61 which extends along its full length and angles outwardly at its rearward end which is designated as 62. The lower surface of sloping plate 61 is even with the top of rollers 41 and is braced by a longitudinal angle iron 63 which encloses the area between rollers 41 and sloping plate 61 as can be seen in FIGURE 3. Angle iron 63 is mounted on two carriages generally designated as 64. A single carriage 64 will be described in detail, it being understood that each carriage 64 provides the same movement to blade 60, but at a position near the rearward end of the blade 60.

Carriage 64 consists of a rectangular box frame 66, shown in FIGURE 3, which rides on a pair of rollers 67 and a pair of V-notched rollers 68. The pair of rollers 67 ride along a flat surfaced track 70 welded between I-beams 38 and adjacent to the top surfaces thereof. The pair of rollers 68 ride along a V-track 71 mounted on track 70 to thereby guide carriage 64 along a straight line.

Mounted on the top surface of box frame 66 is a flat mounting plate 72 which is attached to angle iron 63. Mounting plate 72 is slidably mounted on box frame 66 by means of grooved guides 73 (FIGURE 5). It is positionable by means of screws 74, 75 which are threaded through ears 76, 77 respectively welded to the top surface of box frame 66. Screws 74, 75 abut opposite transverse ends of mounting plate 72 to positively position it on the carriage 64.

As can best be seen in FIGURE 3, the carriage 64 is movable in response to rotation of picker shaft 37. Shaft 37 has fixed to it a sprocket 78 which is of the same diameter as pinion 36. A chain 80 is in meshing engagement with sprocket 78 and extends upwardly to the carriage 64, where one end of chain 80 is attached to box frame 66. An idler sprocket 81 is mounted on the top of one I-beam 38 intermediate the sprocket 78 and carriage 64 and is also in mesh with the chain 80.

The remaining end of chain 80 passes across the I-beams 38 and is in mesh with an idler sprocket 82 mounted on bracket 83 fixed to the outer surface of the other I-beam 38. Chain 80 then meshes with a third idler sprocket 84 and has its remaining end attached to the other side of box frame 66. Sprocket 84 is slidably mounted on the top of the I-beam 38 and can be moved in a transverse direction by screw 85 which is threaded through an ear fixed to track 70. The purpose of screw 85 is to allow adjustment of the tension in chain 80.

Thus it can be seen that chain 80 is operative to move carriage 64 transversely on tracks 70 and 71. This movement will be exactly equal to the controlling motion of rod 33. In this manner, the forward edge of vertical blade 60 is maintained in line with saw 26. Vertical blade 52 is aligned with the straightedge 27. It should therefore be evident that the blades 52, 60 will be aligned automatically to separate the edgings from the finished board is all possible combinations of the saws 24—26. This is possible since one saw 24 or 25 will always be aligned with the usual position of straightedge 27 and the vertical blade 52. Saw 26 will always be aligned with the vertical blade 60. All cutting will always be done between saw 26 and the usual position of straightedge 27 whether or not the straightedge 27 is being used on the particular board being processed.

The vertical blade 60 is not parallel to vertical blade 52. The connection of angle iron 63 to carriage 65 is displaced toward the outer edge of the outfeed table 12. This taper is very slight—on the order of two inches in eight feet—being just sufficient to accommodate warped or rough boards between blades 52 and 60 without the possibility of binding.

The operation of the device seems obvious. The cut boards will drop between blades 52 and 60 to be carried by rollers 41 for final disposition. The edgings will fall along sloping plates 53 or 61. Edgings on plate 53 will fall directly to the slasher deck 14. Edgings on plate 61 will fall to the plates 40 and will be moved transversely by screw rolls 41a until they fall from outfeed table 12 to slasher deck 14.

The elevated roller 44 keeps the board from tilting out of contact with the saws when its far end is approached. Roller 44 maintains the board in its proper position on power rollers 20, 21 to insure completion of the cutting operation by edger 10. Mounted directly above roller 44 is a limit switch 86 which is carried by an overhead bracket 86a fixed to the stationary plate 53 (FIGURES 2 and 6). Switch 86 is connected in series to the input connections in the power supply for the controls in power pack 34. It is normally closed, but is opened by contact with a board between the vertical blades 52 and 60. Switch 86 insures the locking of power pack 34 until a complete board has passed between blades 52 and 60 over roller 44 to the lower rollers 41, where clearance is provided for movement of the blades 52 and 60. The power pack 34 may be reset for the next board while one is being processed, but this setting cannot take effect until switch 86 is closed. It then takes effect automatically to index the saws 24—26 and the vertical blades 52 and 60 for the next board. The board 69 already finished will fit under the sloping plate 61 even if 60 is brought much closer to 52 than before (see FIGURE 3).

FIGURES 7 to 10 show a slightly modified form of the invention. The basic considerations are identical to those explained above and repetitious description will not be given. The general arrangement contemplates a multiple-bladed edger 79, an infeed table 89 and an outfeed table 87 mounted above a slasher deck 88 (FIGURE 9). The infeed table 89 is identical to that shown before and is equipped with a straightedge 90 that may be moved back from the position of FIGURE 7 when a board has a wane on both sides.

The edger 79 has three saws 91, 92, 93 which are controlled by push rods 94, 95 and 96 respectively (FIGURE 10). Rods 94—96 are operated by a power pack 97 identical to that previously described. The rod 96 which moves saw 93 is equipped with a rack 98 that is in mesh with a pinion 100 fixed to a picker shaft 101.

The edging picker mounted above outfeed table 87 consists of a stationary blade 102 aligned with the straightedge 90 and a movable blade 103. Blade 102 is supported by braces 104 fixed to beam 105 of the outfeed table 87 (FIGURE 8). Blade 102 has fixed to it an angularly positioned ledge 106 which projects outwardly beyond the edge of beam 105 to direct edgings to slasher deck 88.

The movable blade 103 has one end pivoted at 107. The pivot consists of a rod 108 mounted on beam 110 of outfeed table 87. A collar 111 is fixed to an ear 112 extending from blade 103 and is rotatably carried by the rod 108. See FIGURE 9. Blade 103 has fixed to it a ledge 113 which is narrow adjacent to pivot 107 and widens to a maximum width adjacent the edger 79. Ledge 113 is cut away to clear elevated roller 114 on outfeed table 87 and has a depending vertical flange 115 which prevents edgings from falling back into the outfeed table 87. The end of blade 103 adjacent to edger 79 is supported upon a carriage consisting of a laterally positioned vertical plate 116 mounted upon two rollers 117 which ride upon a flat surfaced bar 118 supported by beams 105 and 110. Bar 118 extends beyond beam 110 and is connected to a vertical support plate 119, which in turn is connected to a horizontal bar 120 also fixed to beams 105 and 110 at their lower surfaces. A bearing 121 mounted at the lower end of support plate 119 carries the rear end of picker shaft 101 on which is mounted a sprocket 122 of a diameter equal to that of pinion 100.

An idler sprocket 123 is mounted on one end of bar 118 and a second idler sprocket 124 is mounted on the remaining end of bar 118. A third idler sprocket 125 is fixed to the lower surface of horizontal bar 120. A chain 126 is in mesh with sprockets 122, 123, 124 and 125 and has its ends connected to opposite ends of a threaded shaft 127 carried upon an ear 128 protruding from plate 116 and positionable by means of two nuts 130, 131. By adjusting nuts 130, 131, a fine adjustment of the location of blade 103 may be accomplished.

The outfeed table 87 in this case is shown provided with a conveyor belt 132 which rides along rollers in conventional manner. The finished lumber must pass over elevated roller 114 before dropping to conveyor 132. Roller 114 may be driven from the conveyor 132 in any desired manner adapted to drive each at the same peripheral speed. A limit switch 135 is mounted above roller 114 in the manner previously disclosed, and operates to control power pack 97 by opening its input power circuit when a board is in contact with it.

The relations of the blades 102 with respect to the edger 79 and the components of outfeed table 87 is analogous to that previously described. Operation of this embodiment should be obvious. The forward edge of movable blade 103 will follow the movement of the outside saw 93 in edger 79 and will remove any edging cut from that side. Blade 102 will remove any edging cut from the straightedge side of the board, with which saw 91 or 92 will always be aligned. The use of a pivoted blade 103 automatically tapers the distance between the blades 102 and 103 for all widths and also urges the edgings laterally along outfeed table 103, removing the need for additional moving means such as the screw rolls previously described.

It is felt that the above description is sufficient to enable one skilled in this art to fully understand and use this invention. Although both edgers shown used two saws, this invention may be used with a single saw or with any multiple number of saws. Various obvious modifications will be required in adapting this edging picker to different edgers. Such modifications are not intended to carry the final product from the scope of the claimed invention so long as the basic structural concepts are retained. Only the following claims are intended to define the extent of this invention.

Having thus described our invention, we claim:

1. An automatic edging picker for sawmills adapted to segregate edgings from the finished portions of boards emerging from an edger equipped with work support rolls and a plurality of individually positionable saws, comprising a receiving table located elevationally below the edger support rolls, a pair of transversely spaced vertical blades extending longitudinally along said receiving table at an elevation vertically spaced above its upper surface and intersecting the elevation of materials emerging from the edger, individual clearance means fixed to said blades and respectively extending outwardly therefrom, and individual support means mounted on said receiving table respectively carrying the outer ends of said clearance means, said individual support means for each of said blades being mounted on said receiving table for movement relative to one another and being operatively connected to the edger saws whereby one of said blades is maintained in a position with its end edge adjacent the edger in longitudinal alignment with a first saw and the remaining blade is maintained in a position with its end edge adjacent the edger in longitudinal alignment with a second saw.

2. An edging picker as defined in claim 1 wherein one of said blades is stationary and carried by said support means in a fixed position aligned with a stationary saw of the edger, the remaining one of said blades being movably carried by said support means so as to maintain its end edge adjacent the edger in alignment with a movable saw of the edger.

3. An automatic edging picker for sawmills adapted to segregate edgings from the finished portions of boards fed onto an outfeed table from an edger equipped with a plurality of laterally positionable saws, comprising a stationary vertical blade extending longitudinally along the outfeed table, positioned above said outfeed table and adapted to interpose between one edging of a board and its finished portion, a movable vertical blade extending longitudinally along the output table, positioned above said outfeed table and adapted to interpose between a second edging of a board and its finished portion, said movable blade being mounted upon a plurality of longitudinally spaced carriages, each adapted to travel across the outfeed table along laterally oriented tracks, means operatively connected to the mounting for one of the saws adapted to move said movable blade in response to movement of said one of the saws whereby the saw and the leading edge of the movable blade are maintained in alignment, said last named means including a longitudinal picker shaft operatively connected to the mounting for said one of the saws and adapted to be rotated in response to lateral movement of said one of the saws, and means operatively connecting said picker shaft and each of said carriages adapted to move said carriages on said tracks a distance corresponding to the lateral movement of said one of the saws.

4. An automatic edging picker for sawmills adapted to segregate edgings from the finished portions of boards fed onto an outfeed table from an edger equipped with a plurality of laterally positionable saws, comprising a stationary vertical blade extending longitudinally along the outfeed table, positioned above said outfeed table and adapted to interpose between one edging of a board and its finished portion, a movable vertical blade extending longitudinally along the output table, positioned above said outfeed table and adapted to interpose between a second edging of a board and its finished portion, said movable blade being mounted at its end opposite to the edger upon a vertical pivot fixed to the outfeed table, the end of said movable blade adjacent to the edger being mounted upon a carriage adapted to travel transversely across the outfeed table, means operatively connected to the mounting for one of the saws adapted to move said movable blade in response to movement of said one of the saws whereby the saw and the leading edge of the movable blade are maintained in alignment, said last named means including a longitudinal picker shaft operatively connected to the mounting for said one of the saws and adapted to be rotated in response to lateral movement of said one of the saws, and means operatively connecting said picker shaft and said carriage adapted to move said carriage across the outfeed table a distance corresponding to the lateral movement of said one of the saws.

5. An automatic edging picker for sawmills adapted to segregate rough edgings from finished boards in conjunction with an edger having work supporting rolls and a plurality of laterally positionable saws, one of which is maintained in longitudinal alignment with an infeed straightedge position, comprising an outfeed table assembly extending longitudinally rearward of the edger, said table assembly including powered means positioned at an elevation below that of the edger rolls adapted to move boards positioned thereon in a longitudinal direction relative to the outfeed table assembly, a first longitudinal straight blade vertically spaced above said powered means in alignment with the infeed straightedge position, first support means fixed to said first blade and to said table assembly, said first support means extending from said first blade transversely outward toward the adjacent edge of said outfeed table assembly, a second longitudinal upright blade vertically spaced above said powered means transversely adjacent to said first blade, second support means fixed to said second blade and extending transversely outward therefrom toward the adjacent edge of said table assembly, said second support means being mounted on said table assembly for motion in a horizontal direction, and means operatively connected to said second support means adapted to maintain the end of said second blade adjacent the edger in longitudinal alignment with one of the edger saws.

6. The edger picker defined in claim 5 further comprising a transversely positioned powered roller mounted on said outfeed table assembly intermediate the ends of said blades adapted to support the boards within the edger to insure completion of each sawing operation.

References Cited in the file of this patent

UNITED STATES PATENTS

| 235,824 | Story | Dec. 21, 1880 |
| 1,038,215 | Shaw | Sept. 12, 1912 |
| 1,150,551 | Sparks | Aug. 17, 1915 |
| 1,573,705 | Hauck | Feb. 16, 1925 |
| 1,686,966 | Foreman | Oct. 9, 1928 |
| 1,867,873 | Browne | July 19, 1932 |
| 1,920,584 | Osterberg | Aug. 1, 1933 |
| 2,077,119 | Lof | Apr. 13, 1937 |
| 2,714,906 | Peterson | Aug. 9, 1955 |

FOREIGN PATENTS

| 917,502 | Germany | Sept. 6, 1954 |